United States Patent [19]

George et al.

[11] Patent Number: 4,752,130
[45] Date of Patent: Jun. 21, 1988

[54] OPTICAL SYSTEMS UTILIZING A VOLUME TRANSMISSION DIFFRACTION ELEMENT TO PROVIDE WAVELENGTH TUNING

[75] Inventors: Nicholas George, Pittsford; Thomas W. Stone, Rochester, both of N.Y.

[73] Assignee: The University of Rochester, Rochester, N.Y.

[21] Appl. No.: 922,913

[22] Filed: Oct. 24, 1986

[51] Int. Cl.$^4$ ............................. G01J 3/18; H01S 3/08
[52] U.S. Cl. ..................................... 356/334; 372/102
[58] Field of Search ....................... 356/305, 328, 334; 372/20, 92, 98, 102; 350/162.2, 162.24

[56] References Cited

U.S. PATENT DOCUMENTS

| | | | |
|---|---|---|---|
| 3,069,966 | 12/1962 | White | 356/334 |
| 3,872,407 | 3/1975 | Hughes | 372/20 |
| 4,028,636 | 6/1977 | Hughes | 372/20 |
| 4,068,954 | 1/1978 | DaSilva | 356/334 |
| 4,191,474 | 3/1980 | Passereau | 356/305 |
| 4,208,637 | 6/1980 | Matsuda et al. | 372/7 |
| 4,229,710 | 10/1980 | Shoshan | 372/102 |
| 4,241,998 | 12/1980 | Farkas et al. | 356/319 |
| 4,241,999 | 12/1980 | Poney | 356/331 |
| 4,262,996 | 4/1981 | Yao | 350/96.19 |
| 4,285,596 | 8/1981 | Landa | 356/308 |
| 4,298,845 | 11/1981 | Laude | 372/99 |
| 4,416,505 | 11/1983 | Dickson | 350/162.2 X |
| 4,447,111 | 5/1984 | Leib | 350/3.7 |
| 4,449,821 | 5/1984 | Lee | 356/319 |
| 4,451,412 | 5/1984 | Loiseaux et al. | 350/162.2 X |
| 4,455,088 | 6/1984 | Koike | 356/334 |
| 4,461,573 | 7/1984 | Lucht et al. | 356/318 |
| 4,545,646 | 10/1985 | Chern et al. | 350/162.2 |

OTHER PUBLICATIONS

J. M. Burch & D. A. Palmer, "Interferometric Methods for the Photographic Production of Large Gratings" Optica Acta, 8, 73(1961).
A. Labeyrie & J. Flamand, "Spectrographic Performance of Holographically Made Diffraction Gratings", Optics Comm. 1, 5 (1969).
A. K. Rigler & T. P. Vogl, "On Some Properties of Photographically Produced Diffraction Gratings", Applied Optics, 5 1086 (1966).
N. K. Sheridon, "Production of Blazed Holograms". Applied Physics Letters, 12, 316 (1968).
T. A. Shankoff & R. K. Curran, "Efficient, High Resolution, Phase Diffraction Gratings", Applied Physics Letters 13, 239 (1968).
G. S. Hayat, J. Flamand, N. Lacrois & A. Grillo, "Designing A New Generation of Analytical Instruments Around the New Types of Holographic Diffraction Grating", Optical Engineering, 14, 420 (1975).
R. F. Gerrell & G. W. Stroke, "Some New Advances in Grating Ruling, Replication, and Testing", Applied Optics 3, 1251 (1964).
N. George & J. W. Matthews, "Holographic Diffraction Gratings", Applied Physics Letters, 9, 212 (1966).
T. A. Shankoff, "Phase Holograms in Dichromated Gelatin", Applied Optics, 10, 2101, (1968).
T. Stone & N. George, "Wavelength Performance of Holographic Optical Elements", Applied Optics, 24, 3797 (1985).
T. Stone & N. George, "Bandwidth of Holographic Optical Elements," Optic Letters, 7, 445 (1982).
T. Stone & N. George, "Holographic Optical Elements," Ph.D. Thesis, University of Rochester, (1968), pp. 63–65.

Primary Examiner—Eugene R. LaRoche
Assistant Examiner—Davis Mis
Attorney, Agent, or Firm—Martin LuKacher

[57] ABSTRACT

An optical system which provides wavelength tuning and which may be a spectrometer, monochromator or tunable laser uses a volume transmission diffraction element which is characterized by a periodic, spatial variation of refractive index or polarizability or other light transmission effecting parameter, and which is distributed throughout the volume of the element. The wavelength is tuned by (1) varying the angles of the incident and diffracted light symmetrically with respect to the periodic distribution in the element and/or (2) by varying the spatial period of the diffracting element's volume modulation distribution which is maintained symmetric with respect to fixed incident and diffracted beam angles.

36 Claims, 11 Drawing Sheets

OPTICAL SYSTEMS UTILIZING A VOLUME TRANSMISSION DIFFRACTION ELEMENT TO PROVIDE WAVELENGTH TUNING

DESCRIPTION

The present invention relates to optical systems which provide wavelength tuning and particularly to optical wavelength tuning systems which utilize a volume transmission diffraction element.

The invention is especially suitable for use in monochromators and spectrometers and also in tunable laser systems. The invention will find application wherever wavelength tuning, high resolution, and minimum loss of power of the illumination (high efficiency) is desired.

Volume transmission diffraction elements are characterized by a periodic spatial variation of an optical parameter which effects transmission of light through the elements. The parameter which is utilized is usually the refractive index and/or polarizability of the element. Such elements may be prepared photographically by holographic techniques in bodies of dichromated gelatin or other photo-polymers. Volume transmission optical elements which are produced by holographic techniques are referred to as volume transmission holographic optical elements. The techniques for making such elements are described in greater detail in N. George and J. W. Matthews, "Holographic Diffraction Gratings," Applied Physics Letters, 9, 212 (1966); T. A. Shankoff, "Phase Holograms in Dichromated Gelatin", Applied Optics, 10, 2101 (1968); and T. Stone and N. George, "Wavelength Performance of Holographic Optical Elements", Applied Optics, 24, 3797 (1985).

Wavelength tuning devices of known spectrometers, monochromators and tunable lasers utilize reflective blazed diffraction gratings for dispersion, rather than volume transmission gratings. These reflective blazed gratings provide diffraction and dispersion by surface effects. Reference may be had to the following articles which relate to reflective blazed diffraction gratings and spectrometers and monochromators using the same. J. M. Burch and D. A. Palmer, "Interferometric Methods for the Photographic Production of Large Gratings", Optica Acta, 8, 73 (1961); A. Labeyrie and J. Flamand, "Spectrographic Performance of Holographically Made Diffraction Gratings", Optics Communications, 1, 5 (1969); A. K. Rigler and T. P. Vogl, "On Some Properties of Photographically Produced Diffraction Gratings", Applied Optics, 5, 1086 (1966)—which also shows a transmission grating; N. K. Sheridon, "Production of Blazed Holograms", Applied Physics Letters, 12, 316 (1968); T. A. Shankoff and R. K. Curran, "Efficient, High Resolution, Phase Diffraction Gratings", Applied Physics Letters, 13, (1968); G. S. Hayat, J. Flamand, N. Lacroix, and A. Grillo, "Designing a New Generation of Analytical Instruments Around the New Types of Holographic Diffraction Grating", Optical Engineering, 14, 420 (1975). The following patents show the use of reflective blazed diffraction gratings for wavelength tuning. Some of the gratings shown in these patents are ruled blazed gratings. Others are holographically produced reflective blazed gratings. Reference may be had to R. F. Gerrell and G. W. Stroke, "Some New Advances in Grating Ruling, Replication, and Testing", Applied Optics, 3, 1251 (1964) for further information respecting ruled blazed gratings. A method of making holographic reflective blazed gratings is described in Leib, U.S. Pat. No. 4,447,111, May 8, 1984. The patents showing uses of reflective blazed gratings in spectrometers, monochromators and laser tuning devices are as follows: White, U.S. Pat. No. 3,069,966, Dec. 25, 1962; Hughes, U.S. Pat. No. 3,872,407, Mar. 18, 1975; Hughes, U.S. Pat. No. 4,028,636, June 7, 1977; DaSilva, U.S. Pat. No. 4,068,954, Jan. 17, 1978; Passereau, U.S. Pat. No. 4,191,474, Mar. 4, 1980; Matsuda, U.S. Pat. No. 4,208,637, June 17, 1980; Shoshan, U.S. Pat. No. 4,229,710, Oct. 21, 1980; Farkas, U.S. Pat. No. 4,241,998, Dec. 30, 1980; Poney, U.S. Pat. No. 4,241,999, Dec. 30, 1980; Landa, U.S. Pat. No. 4,285,596, Aug. 25, 1981; Laude, U.S. Pat. No. 4,298,845, Nov. 3, 1981; Lee, U.S. Pat. No. 4,449,821, May 22, 1984; Koike, U.S. Pat. No. 4,455,088, June 19, 1984; and Lucht, U.S. Pat. No. 4,461,573, July 24, 1984.

Reflective blazed diffraction gratings have significantly reduced diffraction efficiencies when they are tuned away from their blaze wavelength. Because of this characteristic blazed reflective gratings, when applied in broadband applications, are typically used under conditions of low diffraction efficiency or are replaced by other gratings which have been blazed for use in different spectral bands. Blazed gratings performance, particularly at low diffraction efficiencies, is further degraded by decreased signal to noise ratio, with the noise including scattered light and diffracted "ghosts". The low efficiencies are particularly detrimental in laser frequency tuners which must operate above a minimum efficiency determined by the laser gain medium. At low efficiencies, there may be insufficient gain in the laser cavity to maintain lasing. Broadband tuning of lasers with reflective blazed gratings is, therefore, not very practical. By broadband tuning is meant tuning over several thousands of Angstroms, for example, at least about 3,000 Å.

Volume transmission gratings exhibit high diffraction efficiencies approaching 100%. However, highly efficient volume transmission holographic gratings have narrow bandwidths when tuned exclusively by a variation in wavelength or by a variation in incident angle. These characteristics of holographic volume transmission gratings are discussed in T. Stone and N. George, "Bandwidth of Holographic Optical Elements," Optics Letters, 7, 445 (1982) as well as in the above referenced article by T. Stone and N. George which appeared in Applied Optics, 24, 3797, (1985). High efficiency may be maintained over broad spectral ranges using these volume transmission gratings however by using a simultaneous variation of tuning angle and wavelength in "Bragg-resonant" tuning, as defined below.

Consider the volume transmission grating case illustrated in FIG. 1(A) consisting of a volume distribution of scattering centers or refractive index with modulation along x. The "grating equation" for this case may be written as $\sin \theta_i + \sin \theta_d = m\lambda/d$; where $\theta_i$, $\theta_d$, m, $\lambda$, and d are the incident and diffracted angles, integer order of diffraction, illumination wavelength, and modulation spatial period respectively, as defined in FIG. 1(A). For the same grating case illustrated in FIG. 1(A), the Bragg equation may be written [see N. George and J. W. Matthews (1966) cited earlier]: $\theta_i = \theta_d = \theta$. The "Bragg resonant" condition exists when the grating equation and Bragg equation are simultaneously satisfied, e.g., when:

$$\sin \theta = m\lambda/(2d) \tag{1}$$

in the above case. Very high diffraction efficiencies may generally be obtained when the Bragg resonant condition exists. Bragg resonant tuning results when the parameters such as wavelength and incident angle are varied in a coupled fashion so that the grating and Bragg equations are simultaneously satified The Bragg-resonant conditions for the more general case of a volume transmission grating where the scattering center- or refractive index-distributions are "tilted" by an angle $\Psi$ with respect to those shown in FIG. 1(A), are given by:

$$2 \cos\Psi \sin(\theta_i - \Psi) = m\lambda/d, \tag{2}$$

where the derivation is given in T. Stone and N. George, "Holographic Optical Elements," Ph.D. Thesis, University of Rochester, (1986), pp. 63–65.

It has been discovered, in accordance with the invention and as discussed above, that by simultaneously adjusting the angles of the light incident on and diffracted from the volume transmission element (tuning the incident and diffracted angles) to maintain the Bragg resonance condition for wavelength tuning or selection, a very broad range of spectral wavelengths (broad bandwidths) can be covered with the same grating while obtaining high peak diffraction efficiencies. It is preferable to use gratings having Q factors of ten or more. The Q factor is related to the thickness of the gratings. The higher the Q factor the higher the peak diffraction efficiency, but the narrower the spectral bandwidth of the grating. Reference may be had to the above identified article by T. Stone and N. George, Applied Optics, 24 at page 3798 for the definition of Q.

Accordingly, it is the principal object of the present invention to provide an improved system for optical wavelength tuning wherein the efficiency of the system (incident optical power in/useful diffracted optical power out) and the bandwidth over which tuning can be obtained is maximized.

It is a further object of the present invention to provide improved optical wavelength tuning systems utilizing a volume transmission diffraction element which is tuned by angular deviations in both the incident and diffracted beams (and/or spatial period variations in the volume diffraction element) to maintain symmetry with respect to the periodic distribution of the parameter in the element which gives rise to diffraction, such as the volume scattering centers where the index of refraction in the volume of the material is maximum thereby maintaining the Bragg resonant condition at the wavelength to which the system is tuned (the selected wavelength).

It is a still further object of the invention to provide an improved optical wavelength tuning system utilizing a volume transmission diffraction grating so as to obtain peak diffraction efficiency over extensive bandwidths and wherein the tuning may be implemented by a mechanism of simple and readily implemented mechanical or electronic design.

It is a still further object of the present invention to provide improved spectrometers, monochromators, and tunable lasers which are tunable with high efficiency over a broad bandwidth.

Briefly described, a wavelength tunable optical system in accordance with the invention utilizes a volume transmission element having a light transmission varying effect therein which has a periodic spatial distribution in a direction along the surface of the element. This element is preferably a volume transmission holographic diffraction grating having a surface upon which light is incident on one side thereof and from which light is diffracted and leaves the element at the opposite side thereof. Means are provided for directing a beam of light to be incident upon the element at the surface (on one side thereof) and for collecting light which is diffracted in the element. Means are provided for varying the angles of incident and diffracted light symmetrically with respect to the periodic spatial distribution of the transmission-varying effect which causes diffraction of the light in the element. The angles are varied to maintain the Bragg resonant condition to tune the wavelength of the collected, diffracted light over a broadband width and with high efficiency. The element may be a volume diffraction acousto-optical grating cell in which case the spatial period is varied to maintain the Bragg resonant condition while tuning the wavelength.

The foregoing and other objects, features and advantages of the invention as well as presently preferred embodiments thereof, will become more apparent from a reading of the following description in connection with the accompanying drawings in which.

Figure 6:
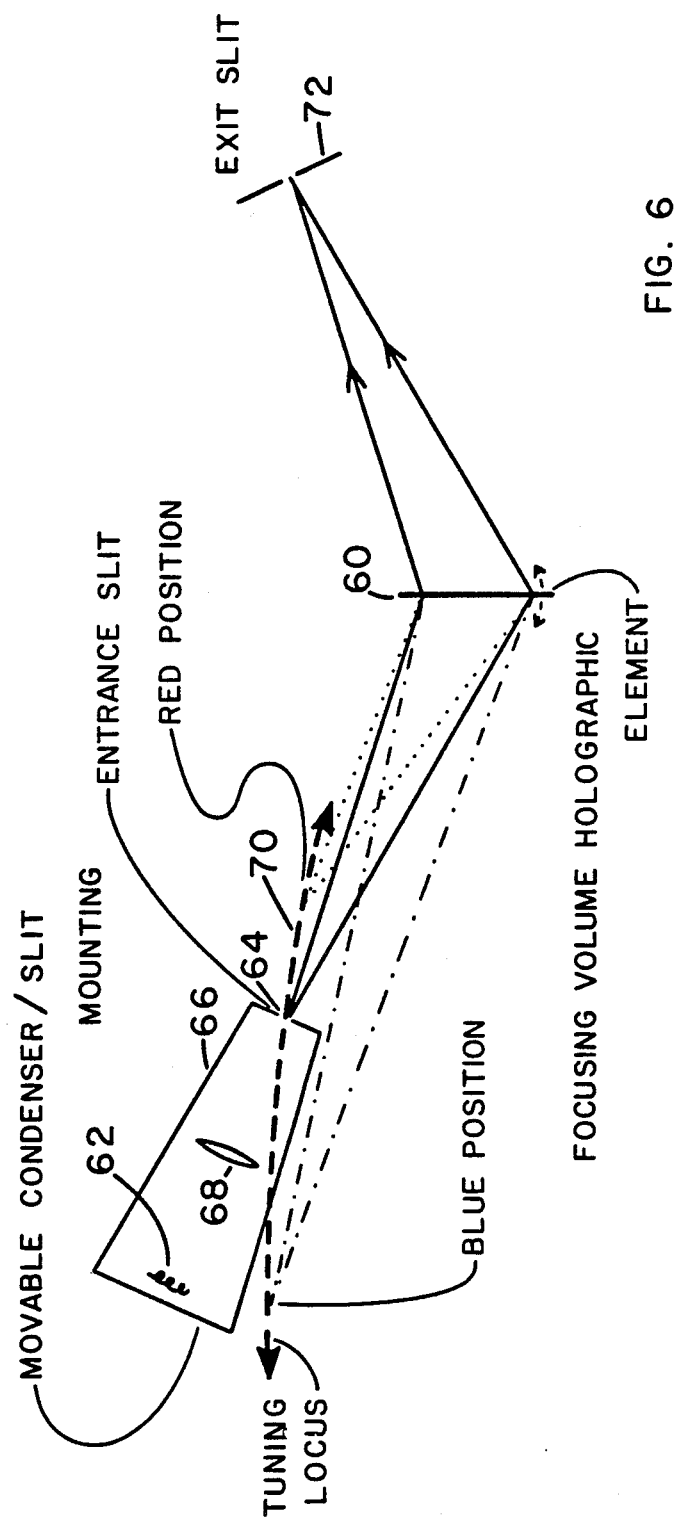
Figure 7:
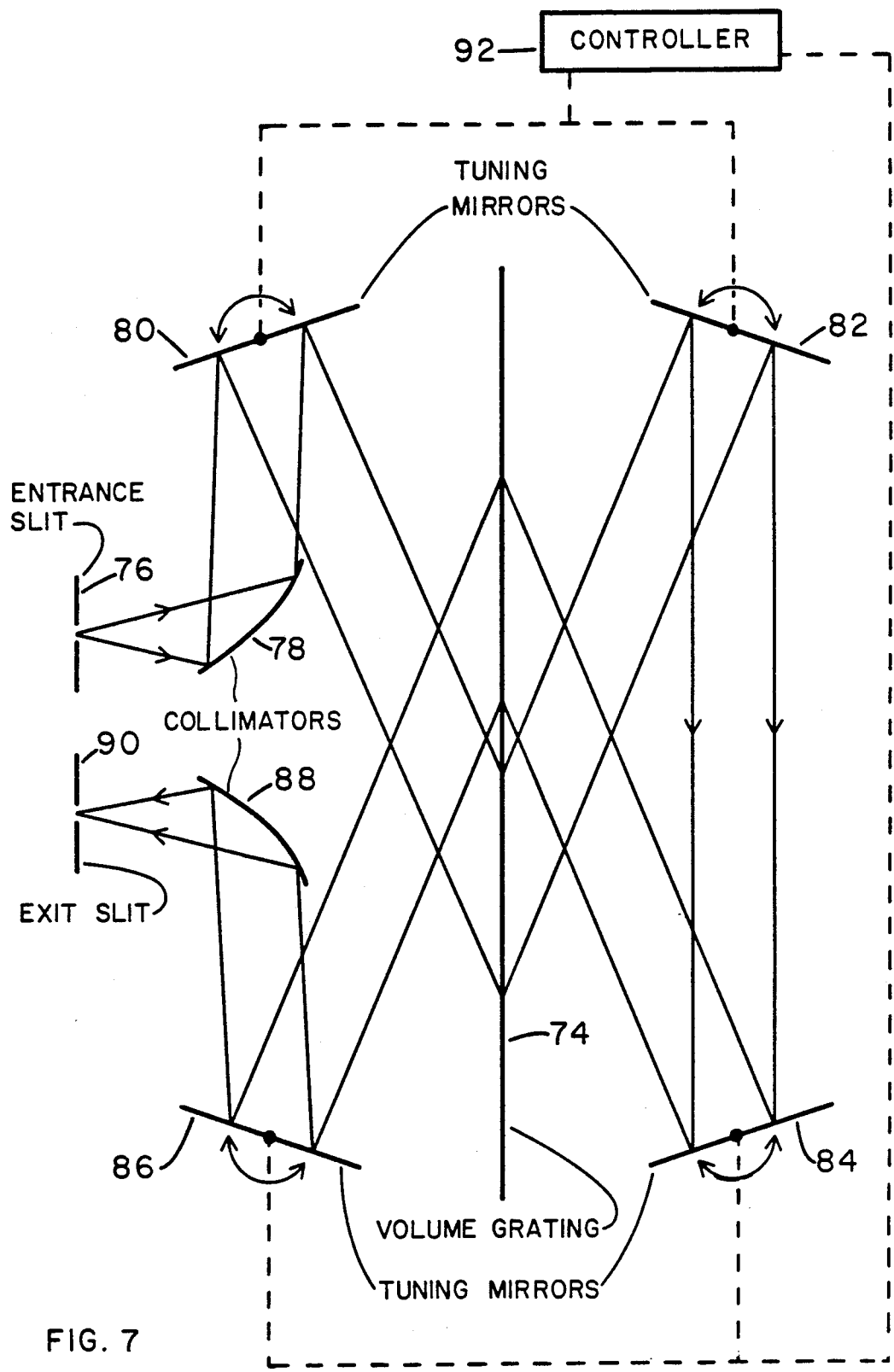
Figure 8:
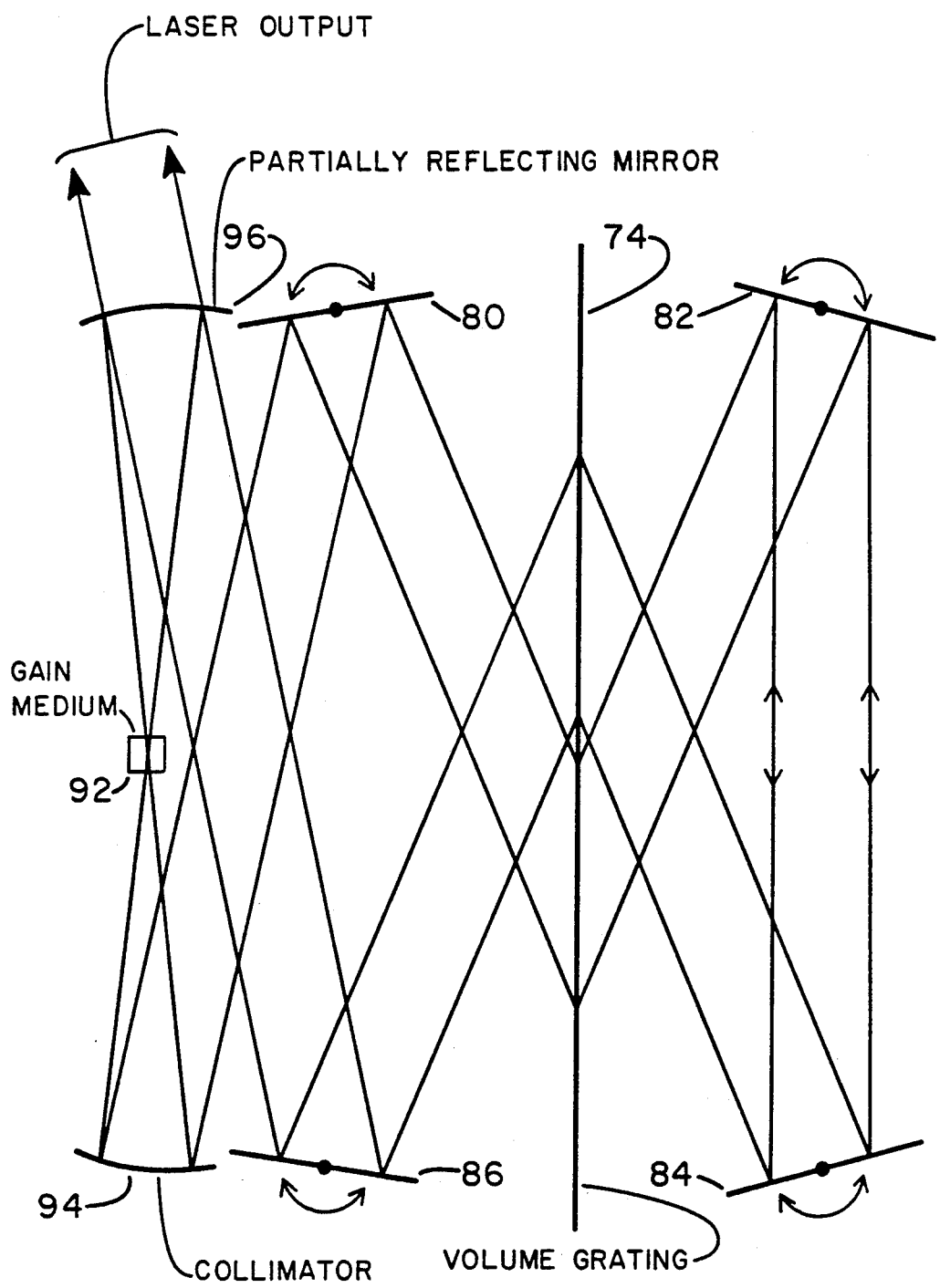
Figure 9:
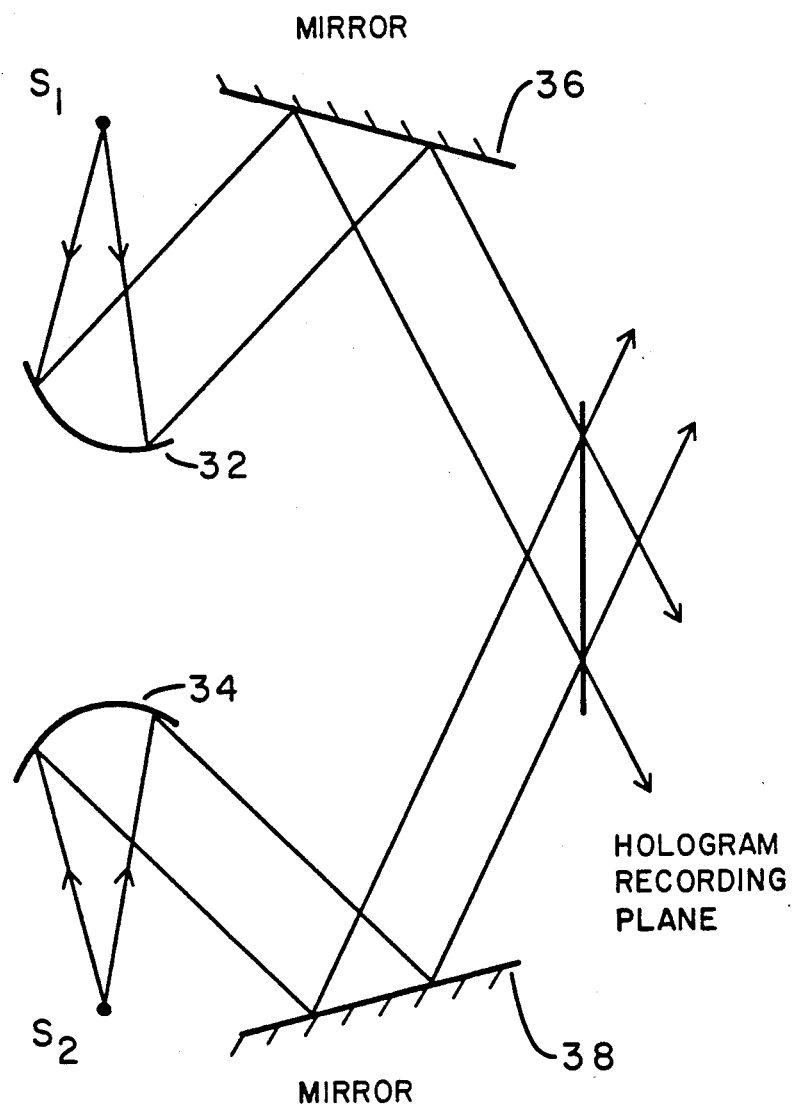

FIG. 6 is a diagrammatic view of a monochromator and spectrometer utilizing a tuning system in accordance with another embodiment of the invention employing a volume transmission holographic grating which is capable of focusing effects and is a convergent element (further information with respect to such convergent elements being available in the above referenced article by T. Stone and N. George in Optics Letters, 7, 445 (1982)—see also Yao, U.S. Pat. No. 4,262,996, Apr. 21, 1981 for gratings which function as lenses);

FIG. 7 is a diagrammatic view of a double pass spectrometer or monochromator wherein dispersion and resolution are increased by virtue of the double pass through a volume transmission holographic grating and which is tunable over a broad bandwidth with higher diffraction efficiency in accordance with the invention;

FIG. 8 is a diagrammatic view of a tunable laser utilizing the double pass tuning system which is shown in FIG. 7; and FIG. 9 is a diagrammatic view of a system for making (recording) the volume transmission holographic diffraction gratings which are used in the embodiments of the system illustrated in FIGS. 1-5, 7 and 8.

Figure 10:
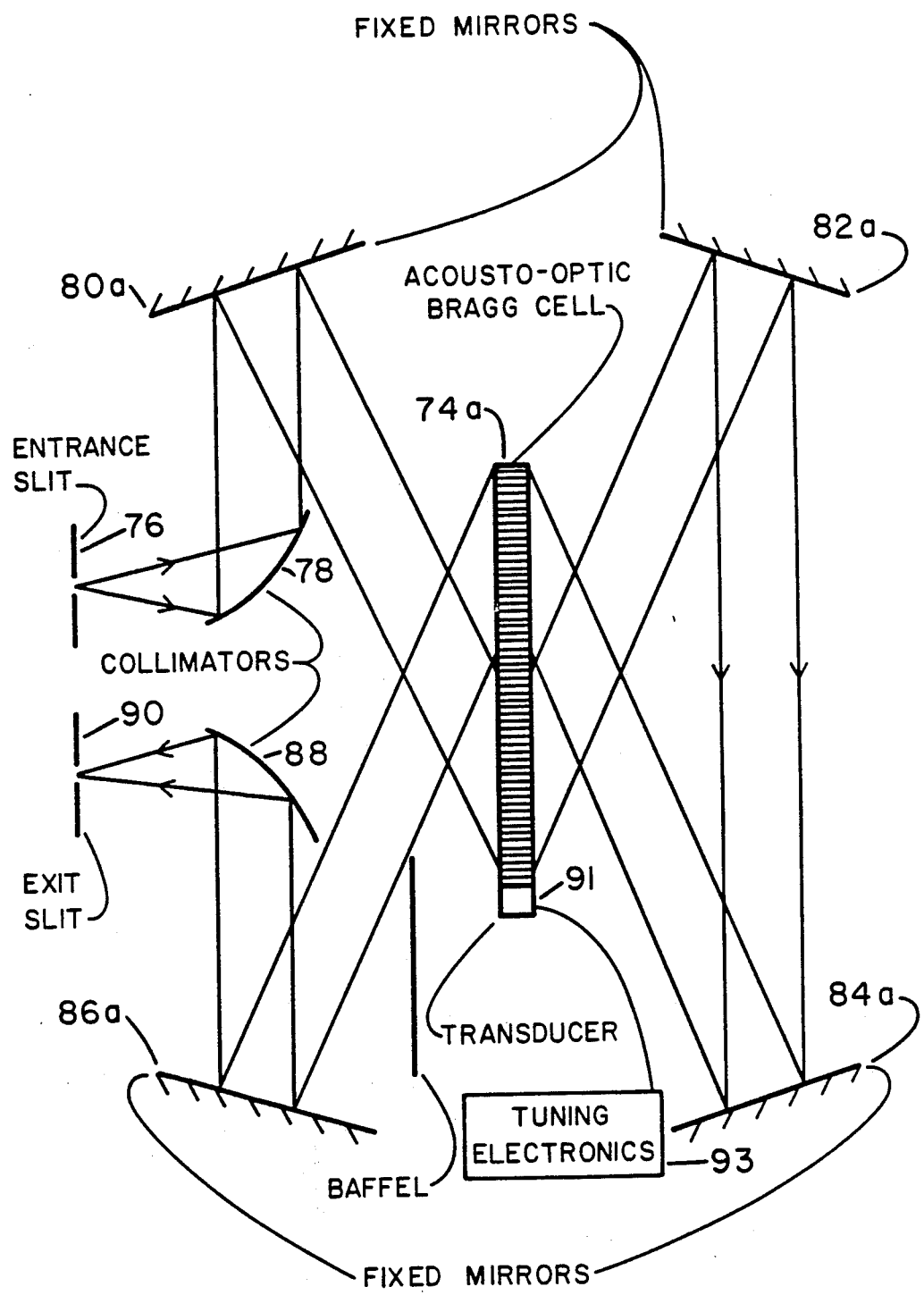

FIG. 10 is a diagrammatic view of a double pass tuning system in which the volume grating is formed using an acousto-optic Bragg cell and which is efficiently tunable over a broad spectral band purely by electronic means.

Figure 1:
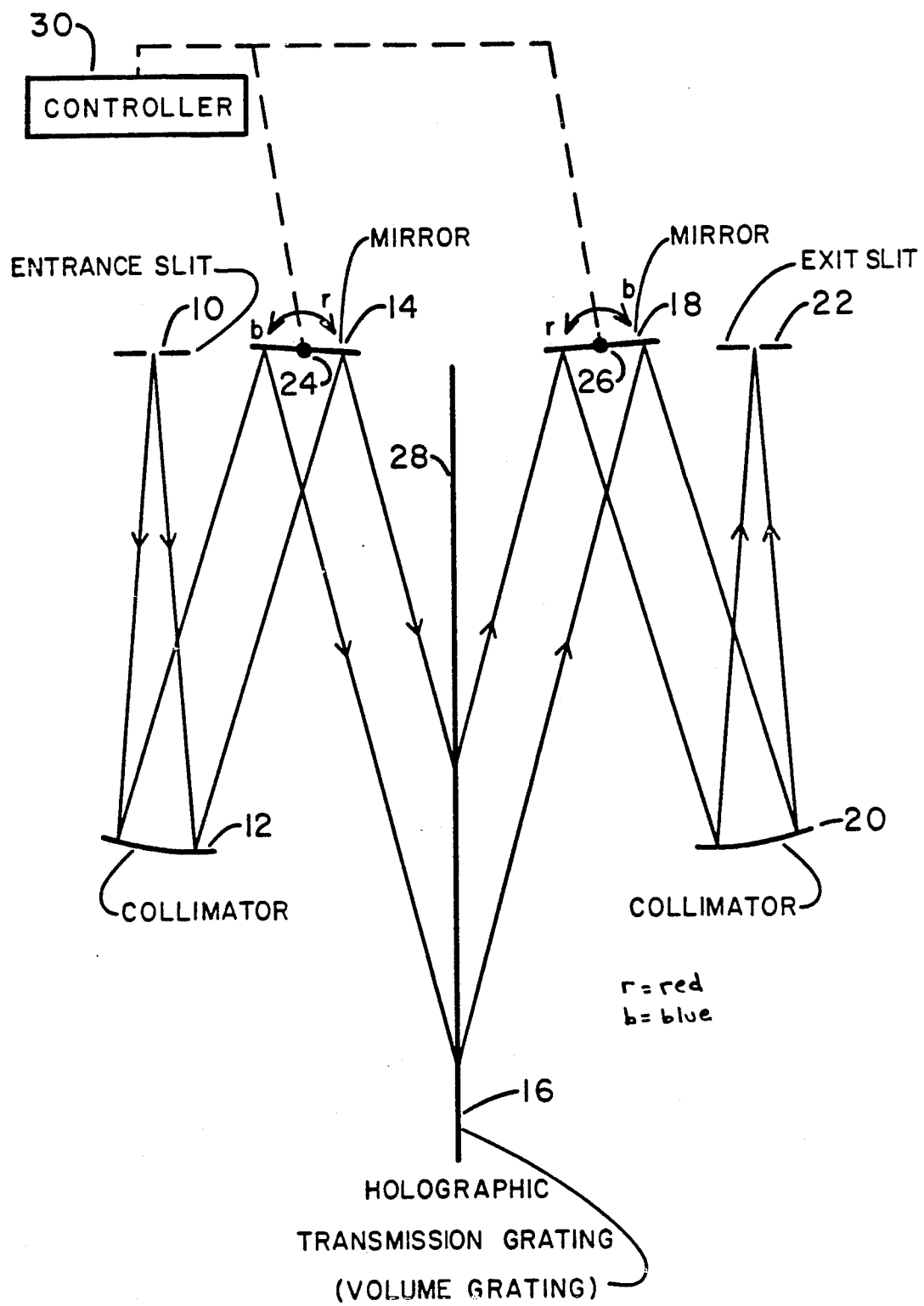
FIG. 1 is a diagrammatic plan view of a system operative as a spectrometer and monochromator while providing Bragg-resonant transmission through a volume transmission holographic diffraction grating.
Figure 1A:
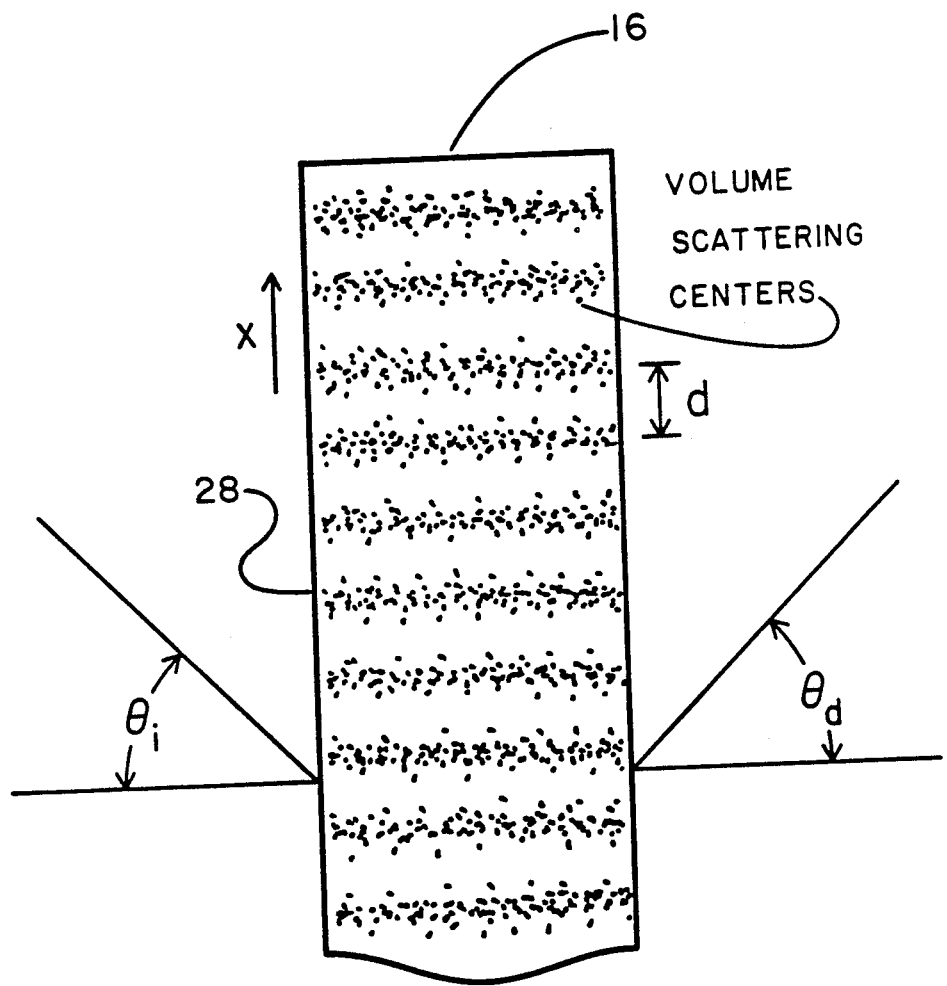
FIG. 1A is a fragmentary view of the volume transmission diffraction grating illustrating diagrammatically the volume scattering centers or regions of modified index of refraction which are distributed through the volume of the element and showing symmetric angles of incidence and diffraction, $\theta_i$ and $\theta_d$ of the incident and diffracted beams to maintain the Bragg resonant condition.

Referring to FIGS. 1 and 1A, there is shown a Bragg-resonant transmission spectrometer, which is provided when the system is continually tuned and a monochromator, which is provided when the system is set to select a particular optical wavelength. An aperture in the form of an entrance slit 10 and a collimator 12 in the form of a collimating mirror directs incident light to a first tuning mirror 14. The collimator forms the light into a beam which is incident upon a volume transmission holographic grating 16. The diffracted light beam is reflected by a second tuning mirror 18 to another collimator mirror 20 and thence to an aperture which provides an exit slit 22. The incident light directing entrance slit and collimator and the diffracted light collecting collimator 20 and exit slit 22 are fixed The tuning mirrors 14 and 18 are rotatable about axes 24 and 26 which are parallel to the entrance and exit slits and are also parallel to the surface 28 of the grating upon which the light is incident. The mirrors are rotated in unison and in synchronism by a controller 30 which may be a manual knob connecting the assuitable gearing to circular stages of equal diameter One of these stages may contact the other to provide a friction drive. The mirrors therefore counter-rotate with equal angles ($\theta$—$\theta$ rotation) to accomplish tuning. The wavelength is tuned by symmetric deviations in both the incident and diffracted beams with respect to the periodic distribution of the effect which determines transmission through the grating. These may be the scattering centers or the loci of the sinusoidal modulation of the index of refraction or polarizability along the surface of the grating.

These scattering centers are illustrated in FIG. 1A. The planes perpendicular to the surface 28 through each row of scattering centers are sometimes called the fringe planes or Bragg planes. The incident and diffracted angles $\theta_i$ and $\theta_d$ are symmetric with the distribution of the scattering centers. In other words, these angles $\theta_i$ and $\theta_d$ are symmetric with a vertical plane through the center of the grating in this embodiment. The distribution of the centers or modulation of the index of refraction or polarizability varies in a direction along the surface 28 (the x direction as shown in FIG. 1A); the variation being in accordance with sin x for example, although other functional periodic forms may be useful. Constant spatial dependence of modulation is preferred when the grating is used in the spectrometer or monochromator or wavelength tuning systems illustrated in FIGS. 1-5 and 6-9. The modulation may be spatially nonlinear or "chirped" when the grating has power for focusing the incident light as is the case in the embodiment illustrated in FIG. 6.

The gratings may be fabricated utilizing the aberration correction recording geometry illustrated in FIG. 9. In FIG. 9, S1 and S2 are point sources of coherent light which are derived from the same source, suitably a laser, such as an argon laser operating at 4880Å. The light is formed into beams by collimator mirrors 32 and 34 and reflected by mirrors 36 and 38, which are fixed for a particular geometry, to the body of dichromated gelatin or any other recording material from which the volume transmission diffraction grating is to be made. The element is located in the hologram recording plane.

The sources S1 and S2 are preferably point or line-segment sources, as formed by a spherical or cylindrical lens focusing a plane wave or by the illumination of a pinhole or slit from light split from the originating laser source. Preferably light from the source S1 has propagated through source optics in the overall device which employs the system (such as the spectrometers, monochromators or lasers discussed in the other Figures of the drawing), so as to incorporate system aberrations present in such systems into the holographic element and thus enable compensation of these aberrations. Accordingly, S2 is preferably an unaberrated light source. The recording material which is illuminated by the symmetrical mirrors, collimators and sources S1 and S2, after exposure, is developed to provide the volume transmission grating The techniques for developing and forming the volume transmission grating are discussed in the above referenced articles, N. George and J. W. Matthews, "Holographic Diffraction Gratings," Applied Physics Letters, 9, 212 (1966); T. A. Shankoff, Applied Optics, 10, 2101 (1968) and T. Stone and N. George, Applied Optics, 24, 3797 (1985).

In the event that a volume transmission holographic grating having focusing power, such as used in the embodiment shown in FIG. 6, is desired, lenses are utilized instead of at least one of the mirrors (e.g., mirror 36) so that the fringe planes increase in density (are closer together) in the x direction from the top to the bottom of the element.

Returning to FIG. 1 it would be noted that the grating 16 is stationary. Only the tuning mirrors turn. As the system is tuned to select wavelengths from the red through the blue portion of the spectrum, the incident and diffracted angles decrease There may be a tuning range of approximately 3,000Å when centered in the visible spectrum, with the red (approximately 6,500 Å) position indicated. The system provides coupled angular and wavelength tuning so as to obtain high resolution with high diffraction efficiency, since the Bragg-resonant condition is maintained over the entire tuning range.

Figure 5:
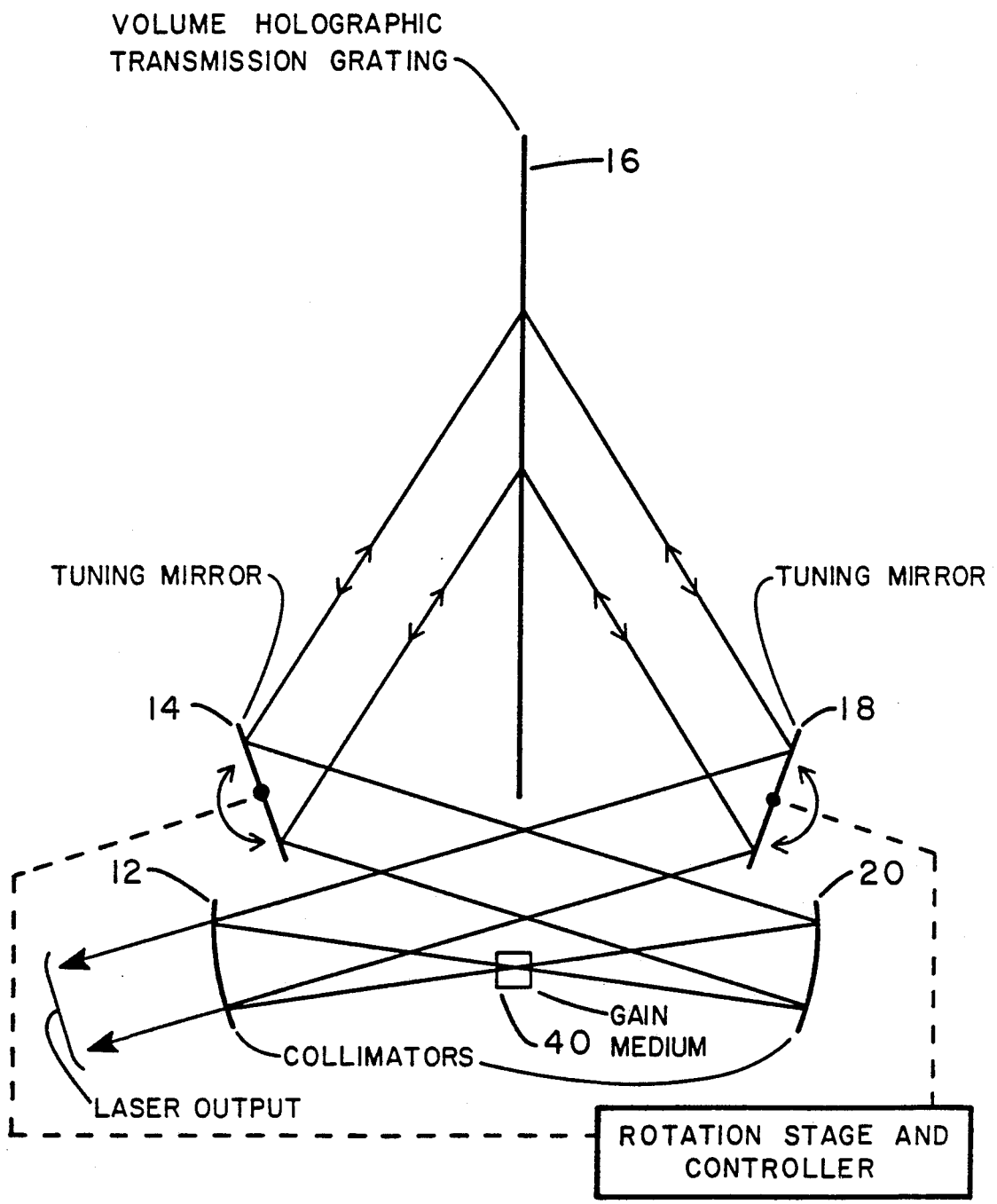
FIG. 5 is a diagrammatic view of a laser utilizing the tuning system illustrated in FIG. 1 in and as part of the laser cavity.

FIG. 5 illustrates a Bragg-resonant tunable laser cavity utilizing a portion of the system illustrated in FIG. 1. Like parts are illustrated by like-referenced numerals. The source of illumination is a laser gain medium 40. This medium is preferably provided by a dye with suitable means of the type known in the art for forming the dye into a jet. The dye provides the source of light at the wavelength selected by the position of rotation of the tuning mirrors 14 and 18. The collimator mirrors 12 and 20, one of which 12 may be partially reflecting to provide the laser output, provides focusing at the gain medium In similar fashion, the laser output may be derived from the undiffracted order(s) at the volume grating. The laser cavity includes the collimator mirrors 12 and 20 as well as the tuning mirrors 14 and 18 and the volume holographic transmission grating 16. The system shown in FIG. 5 forms a tunable ring laser which can support two counter-propagating beams—one of which may be suppressed if desired. Interesting longitudinal mode properties may be obtained as a result of transverse spatial variation in cavity length. The diffraction efficiency of the tuning system over the entire tunable band is high and does not insert enough loss in the cavity to prevent lasing action. It will be observed that the entire configuration is symmetric with the center of a gain medium 40. The beams are focused by the collimators 12 and 20. The focus is at gain medium 40 and is in the same plane (the continuation of the plane of) the grating 16.

Figure 2:
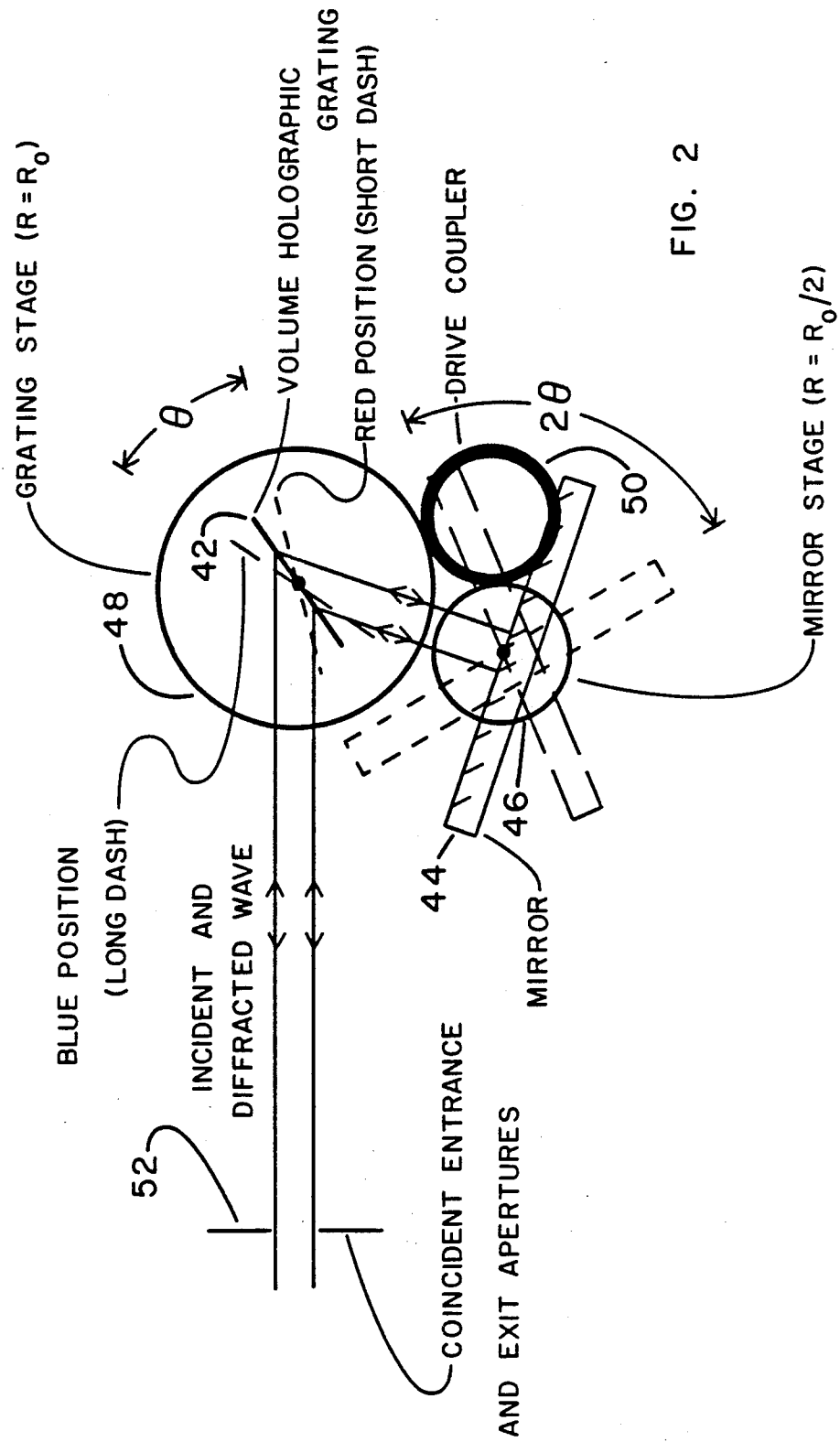
FIG. 2 is a diagrammatic view of an optical wavelength tuner in Littrow configuration incorporating a volume transmission holographic grating, as in the system shown in FIG. 1, wherein the Bragg resonant condition is maintained over the bandwidth which can be tuned.

Bragg-resonant tuning, in accordance with the invention, may be implemented in a retro-reflecting or "Littrow" configuration as shown in FIG. 2. The system utilizes a volume transmission grating 42 and a mirror 44. The mirror is rotably mounted with its axis at the center of a circular mirror stage 46. The grating is mounted with its axis at the center of a circular grating stage 48. The stages are coupled by a drive coupler disk 50 with the radius of the grating stage ($r = R_o$) one-half of that of the mirror stage ($r = R_o/2$). Accordingly the mirror rotates at twice the rate of the grating. For each rotation $\theta$ of the grating 42 there is a $2\theta$ rotation of the mirror 44. The incident and diffracted waves enter and leave through coincident entrance and exit apertures provided by a slit 52, or these apertures may be separated by introducing a slight vertical tilt into the system.

Light incident on the grating 42 is diffracted toward the mirror 44, which retro-reflects the beam. The wavelength is tuned by a rotation of the mirror and grating in synchronism. The incident and diffracted angles in both directions remain symmetric. The angles are equal and at the Bragg-resonant condition.

A tuning range of 3,000 Å is illustrated with the 4,000 Å tuning position represented by the lines made up of long dashes, and the 7,000 Å position represented by the lines of short length dashes.

Figure 3:
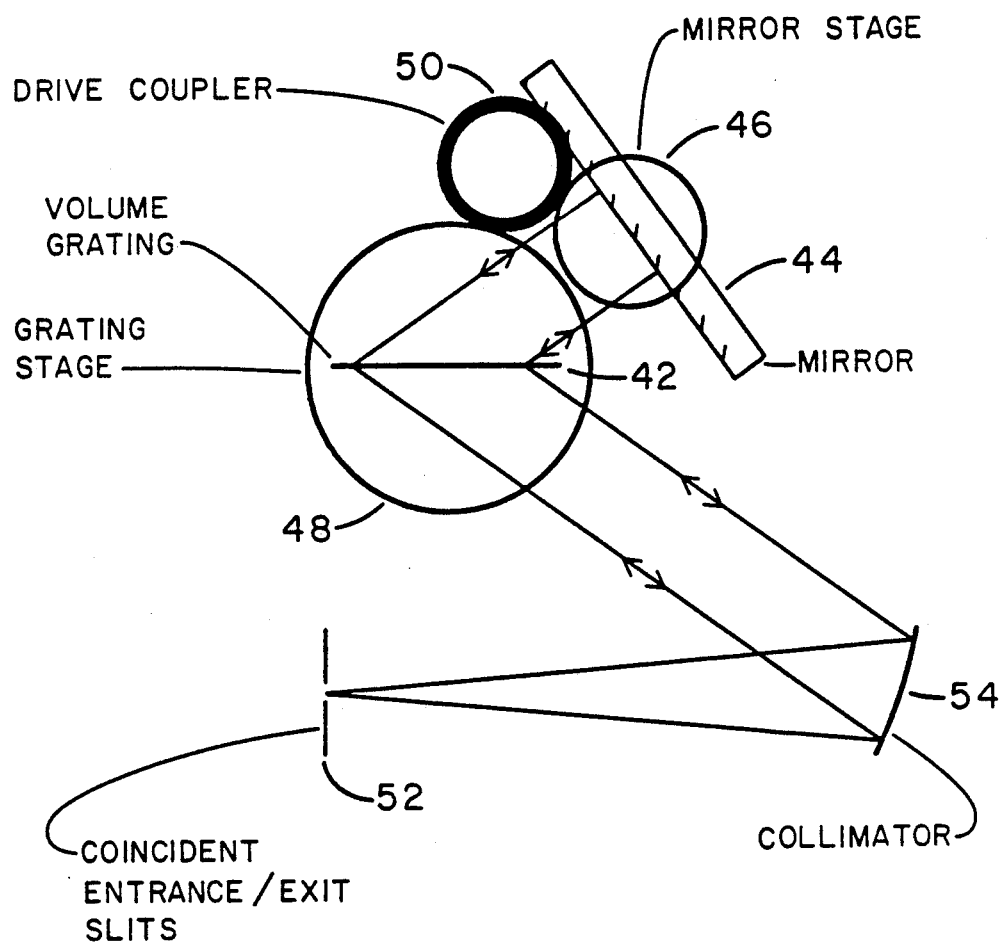
FIG. 3 is a diagrammatic view, similar to FIG. 1, which illustrates a spectrometer and monochromator in Littrow configuration utilizing the tuning system shown in FIG. 2.

The tuning system illustrated in FIG. 2 may be used in a spectrometer and monochromator of Littrow configuration as shown in FIG. 3 where parts similar to those shown in FIG. 2 are designated by like reference numerals. The light from the coincident entrance and exit slits is formed into a beam by the collimator mirror 54. The collimator also focuses the exiting light at the entrance/exit slit 52. The exit and entrance slits may be slightly displaced (e.g., in the vertical dimension), if desired.

Figure 4:
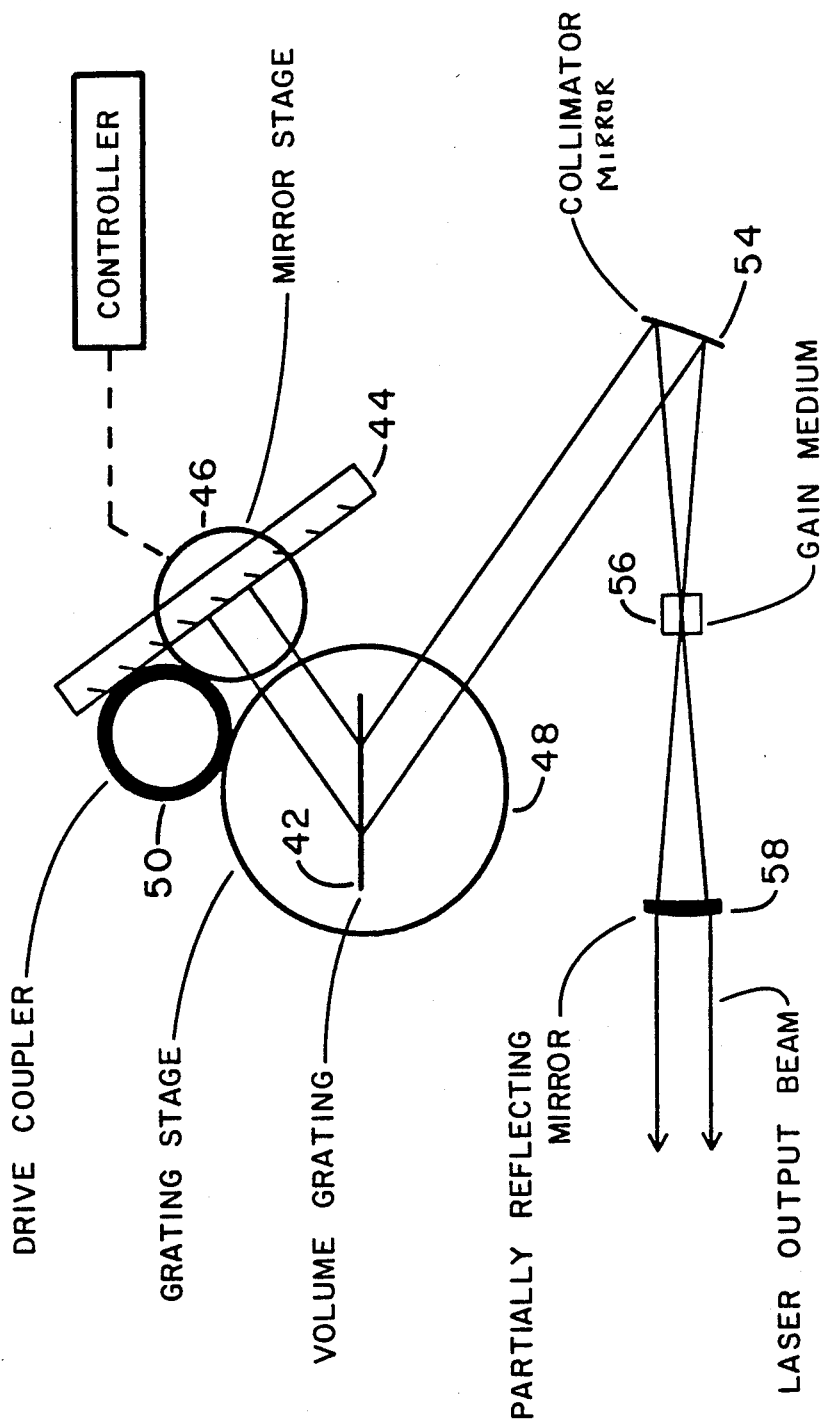
FIG. 4 is a diagrammatic view of laser utilizing the tuning system of Littrow configuration illustrated in FIG. 2 as the tuning element in the laser cavity.

FIG. 4 illustrates the tuning system shown in FIGS. 2 and 3 embodied in a laser for tuning the laser over a broad bandwidth. Parts similar to those described in connection with FIGS. 2 and 3 are designated by like-referenced numerals A laser gain medium 56 which is preferably a dye jet similar to the laser medium 40 discussed in connection with FIG. 5 is disposed at the focus of the collimator mirror 54 and also at the focus of a partially reflecting mirror 58 which outputs the laser beam. The Littrow configuration tuner defines, with the collimator mirror 54 and the partially reflecting mirror 58, the cavity of the laser.

It will be observed that both the symmetric (FIG. 1) and Littrow (FIG. 2) configurations of the wavelength tuning system have space into which rejected band light is transmitted into a greatly separated zero order which may be readily blocked by a light trap, for example a Rayleigh horn. The thick, high-Q grating also causes the formation of an effective "pre-slit" which surrounds the exit slit and limits the spatial extent of illumination in the plane of the exit slit. This further minimizes stray light and enhances the signal to noise characteristics of the instrument incorporating the tuning system.

Referring to FIG. 6 there is shown an instrument which may be used as a monochromator and spectrometer. This instrument employs a volume holographic transmission grating 60 which incorporates focusing power, for example the focusing power of the collimator mirrors used in the instrument illustrated in FIG. 1. The entrance light is generated at a source 62 and focused at an entrance slit 64 of a housing 66 by a condensing lens 68 mounted in the housing 66. The housing is movable along a track to define a tuning locus indicated figuratively by the dash line 70. This tuning locus has a curvature corresponding to the focusing effect of the composite volume hologram grating and lens 60. The holographic lens focuses the diffracted light at the exit slit 72. By moving the housing 66 along the path of the tuning locus, a broad band of wavelengths can be tuned. If it is desired to maximize efficiency, a tilt in the holographic element or corresponding translation of the exit slit may be introduced in order to generally restore the Bragg condition. Alternatively, a fixed entrance slit with tracking exit slit, or simultaneously and symmetrically tracking both entrance and exit slits about a fixed holographic element, may be used. The advantage of the system shown in FIG. 6 is its simplicity and ability to be implemented in a compact package.

FIG. 7 illustrates a double pass monochromator and spectrometer utilizing a volume transmission holographic grating 74. This grating may be similar to the grating 16 described in connection with FIG. 1 except that it is longer in order to cover the double pass of the incident and diffracted beams. Alternatively different gratings may be used which are traversed in each of the multiple passes The light which is to be tuned and wavelength selected enters through an entrance slit 76 and is focused by a collimator mirror 78 on one of a pair of tuning mirrors 80 and 82. The tuning mirror 82 reflects that beam to one of a second pair of tuning mirrors 84 and 86. The light from the last tuning mirror 86 is collected by a collimating mirror 88 and focused at an exit slit 90.

All of the tuning mirrors are coupled together and turned in synchronism about their axis by a common controller 92. Each of the mirrors may be mounted on a circular stage, and the circular stages coupled to each other, so that the first pair 80 and 82 of the mirrors are counter-rotating and the second pair of mirrors 84 and 86 are also counter-rotating. The mirrors 82 and 86, which are in diagonal relationship, rotate in the same direction. The rate of rotation is the same (when any of the mirrors turn an angle $\theta$ all of the mirrors are turned an equal angle $\theta$). This coupled angular movement provides Bragg-resonant tuning which maintains the incident and diffracted angles symmetric with respect to the periodic distribution of the scattering centers which produce diffraction in the grating 74. Inasmuch as dispersion is doubled due to the double pass, the resolution of the double pass system is doubled while the efficiency is maintained, since the Bragg-resonant condition is maintained over the tunable bandwidth. By providing additional pairs of tuning mirrors additional passes may be obtained Referring to FIG. 8 there is shown a laser system having a double pass tuning system of the type illustrated in FIG. 7. Like parts are designated by like-referenced numerals. The mechanism for rotating the mirrors synchronously and in unison are not shown to simplify the illustration.

An active laser medium 92 is provided at the focus of two collimator mirrors 94 and 96. The mirror 96 may be partially reflecting to provide the laser output. These mirrors direct the incident and diffracted beams with respect to the tuning system. The collimator mirrors 94 and 96 also focus the incident and diffracted beams at the gain medium 92, thereby preventing the beams from walking along (moving outside the body of) the medium 92. The medium 92 is preferably a dye jet so as to take advantage of the broad tunable wavelength provided by the tuning system.

In a useful variation on the subject invention, the volume transmission grating in all previously discussed embodiments of the invention (excepting that illustrated in FIG. 6) may be formed by volume refractive index modulation generated in an acousto-optic Bragg cell 74a. According to these embodiments, however, there is no need for mechanical tuning of any of the components in the system while still enabling highly efficient and extremely broadband tuning. One such device is shown in FIG. 10 and is related to the dual pass tuner of FIG. 7 (similar components being identified by like reference numerals) but all components are mechanically fixed. Wavelength tuning is accomplished by varying the electronic drive frequency which is input to the Bragg cell transducer 91, thus effecting change in the spatial period (d) of the volume refractive index modulation. In this form of Bragg Resonant tuning, $\theta_i$ and $\theta_d$ are fixed while the spatial period d is varied to tune $\lambda$ in accordance with Eqs. (1) and (2) presented earlier. Accordingly, the single pass symmetric tuner of FIG. 1 may be made electronically tunable by replacing the volume holographic grating with a volume acousto-optic Bragg cell and mechanically fixing mirrors 14 and 18; the Littrow tuner of FIG. 2 may be rendered electronically tunable by eliminating the rotation stages and utilizing a volume Bragg cell; and in similar fashion the instruments of FIGS. 3–5 and 7–8 may be made electronically tunable. By programming the tuning electronics in these devices so as to optimize the modulation amplitude (e.g., by varying transducer input power) as the frequency is varied, near perfect diffraction efficiencies should be obtainable over extremely broad bandwidths.

From the foregoing description it will be apparent that there has been provided an approved optical wavelength tuning system and instruments and devices incorporating same. It will be appreciated that other instruments and applications for the system as well as variations and modifications thereof, within the scope of the invention, will undoubtedly become apparent to those skilled in the art. Accordingly the foregoing description should be taken as illustrative and not in a limiting sense.

We claim:

1. A wavelength tunable optical system which comprises a volume transmission element having a light transmission varying effect which has a periodic spatial distribution in a direction along the surface of said element, means for directing a beam of light to be incident upon said element at said surface and collecting light which is diffracted in said element, and means for varying the angles of said incident and said diffracted light symmetrically with respect to the periodic spatial distribution of said effect and while maintaining the Bragg resonant condition to tune the wavelength of the collected diffracted light.

2. The system according to claim 1 wherein said element is a volume transmission holographic grating.

3. The system according to claim 2 wherein said grating has light scattering centers throughout the volume thereof which provides said effect.

4. The system according to claim 2 wherein said effect is a periodic spatial distribution of refractive index.

5. The system according to claim 1 wherein said means are provided for varying the period of said periodic spatial distribution.

6. The system according to claim 2 wherein said directing, collecting and varying means comprises at least one mirror defining with said grating the paths of light incident upon and diffracted from said grating, and means for adjusting the orientation of said mirror and grating with respect to each other.

7. The system according to claim 6 wherein said grating is stationary and said directing and varying means comprises a pair of mirrors on opposite sides of said grating, and means for tilting said mirrors in synchronism with each other such that the angles of said incident beam and the angle of diffraction are continuously maintained equal to each other.

8. The system according to claim 7 wherein said tilting means comprises means for counter rotating said mirrors inversion with equal angles of rotation.

9. The system according to claim 8 wherein the axis of rotation of said mirrors are disposed symmetrically with respect to said grating.

10. The system according to claim 2 wherein said grating has a Q greater than 10.

11. The system according to claim 9 wherein said directing and collecting means further comprises means defining entrance and exit apertures for said incident and diffracted light, a first collimator between the one of said pair of mirrors on the side of said grating presenting said surface on which said light is incident and said entrance aperture, a second collimator between the other said pair of mirrors and said exit aperture.

12. The system according to claim 11 wherein said collimators are disposed symmetrically with respect to said grating and said entrance and exit apertures are also disposed symmetrically with respect to said grating.

13. The system according to claim 12 wherein said entrance and exit apertures are slits, said mirrors rotate about axes and said slits and axes are parallel to said surface of said grating, and said system is operative as a monochromator and spectrometer.

14. The system according to claim 1 further comprising a laser gain medium, a laser cavity including said gain medium, said directing and collecting means, said varying means and said element to provide a tunable laser system.

15. The system according to claim 7 further comprising a laser gain medium, a pair of reflecting means between which said gain medium is disposed in light reflecting relationship with said mirrors, said mirrors and said grating defining a laser cavity including said medium, said system thereby providing a tunable laser.

16. The system according to claim 15 wherein said reflecting means are collimators focused at said gain medium.

17. The system according to claim 6 wherein said mirror and said grating are both rotatable about axes which are parallel to each other, said mirror being disposed in retro-reflective relationship with said grating on one side of said grating, said directing and collecting means including means disposed at least one path for light incident upon the side of grating opposite to said one side and for diffracted light from said opposite side of said grating, and said adjustment orienting means comprising means for rotating said mirror and said grating about their axes in unison.

18. The system according to claim 17 wherein said rotating means comprises means for rotating said grating one half the angle of rotation of said mirror whereby to maintain the angles of light incident upon and diffracted from said grating equal and symmetric with respect to said periodic spatial distribution and said grating.

19. The system according to claim 17 wherein said means disposed along at least one path comprises means defining an aperture for the entrance and exit of light and a collimator for directing the incident light on and collecting the diffracted light from said opposite side of said grating.

20. The system according to claim 19 wherein said collimator is focused at said aperture.

21. The system according to claim 20 wherein said aperture is a slit parallel said axes of rotation and said system provides a monochromator and spectrometer.

22. The system according to claim 17 further comprising a laser gain medium, a pair of reflectors on opposite sides of said gain medium and in reflecting relationship therewith, one of said pair of reflectors also being in reflecting relationship with said opposite side of said grating, the other of said pair of reflectors and said rotatable mirror defining the opposite ends of a laser cavity with said gain medium, said one reflector and said grating therein, whereby said system provides a tunable laser.

23. The system according to claim 22 wherein said other of said pair of reflectors is a collimator mirror focused at said gain medium and forming a beam of laser light incident upon said opposite side of said grating.

24. The system according to claim 2 wherein said grating has power and focuses said diffracted light at said collecting means, a source of light which is incident on said surface, said means for directing said incident light upon said surface and varying the angles of incident and diffracted light comprising means defining an aperture through which said light from said source passes to be incident upon said surface of said grating, and means for moving at least one of said aperture and said collecting means relative to the grating along a predetermined path of configuration related to the power of said grating.

25. The system according to claim 24 wherein said source comprising a housing having said aperture and a condensing lens for focusing light from said source at said aperture, said housing be movable to carry said aperture along said path.

26. The system according to claim 25 wherein said aperture is an entrance slit and said collecting means defines an exit slit parallel to said surface of said grating and said system provides a monochromator and spectrometer.

27. The system according to claim 7 wherein said directing and varying means further comprises said first named pair of mirrors and a second pair of mirrors also spaced on opposite sides of said grating, said one of said mirrors of said first pair and one of the mirrors of said second pair which are on the side of said grating opposite to said surface being in reflecting relationship with each other, and means for tilting the mirrors of said first pair in synchronism with and through the same angles as the mirrors of said second pair to provide with said first pair of mirrors a beam of incident and diffracted light which makes the first pass through said grating and then a second pass through said grating while maintaining said angles of incident and diffracted light symmetric with said periodic distribution in said grating.

28. The system according to claim 27 wherein said means for directing said incident light comprises means for providing an entrance aperture, and said means for collecting said diffracted light comprises means providing an exit aperture, both said exit and entrance apertures being on the side of said grating defining said surface, means providing a path for incident light on said surface from said entrance aperture to the other said first pair of mirrors and also from the other said second pair of mirrors to said exit aperture.

29. The system according to claim 27 further comprising a laser gain medium, means for focusing light from different ones of the others of said mirrors of said first pair and second pair on said medium to define with said first and second pairs of mirrors a laser cavity including said medium and said grating, thereby providing a tunable laser.

30. An optical system tunable to transmit light of selected wavelengths which comprises a volume transmission diffraction grating through which a beam of light is transmitted, at least one mirror defining the paths of incident and diffracted light with respect to said grating, and means for adjusting the orientation of said mirror with respect to said grating to maintain the angles of said incident and diffracted light equal and at the Bragg resonant condition for the wavelength which is selected.

31. An optical system tunable to transmit light of selected wavelengths which comprises a holographic diffraction grating operative in transmission and having volume scattering centers which are periodically distributed therein, at least one mirror defining with said grating the paths of light incident on and diffracted through said grating, said mirror being disposed to define angles between said incident light path and the periodically distributed scattering centers and between said diffracted light path and said centers which are symmetric to each other, and means for adjusting the orientation of said mirror and grating with respect to each other to maintain said angles symmetric and at the Bragg resonant condition for the wavelength which is selected.

32. A wavelength tunable optical system which comprises a volume transmission element having a light transmission varying effect which has a variable periodic spatial distribution in a direction along the surface of said element, means for directing a beam of light to be incident upon said element at said surface and collecting light which is diffracted in said element, and means for varying the spatial period of said transmission varying effect symmetrically with respect to fixed incident and diffracted angles to tune the wavelength of the collected diffracted light while maintaining the Bragg resonant condition.

33. The system according to claim 32 wherein said effect is a periodic spatial distribution of refractive index formed by traveling acoustic waves in a volume acousto-optic Bragg cell which provides said element.

34. The system according to claim 32 wherein said effect is a periodic spatial distribution of refractive index formed by standing acoustic waves in a volume acousto-optic Bragg cell which provides said element.

35. The system according to claim 32 wherein said system provides apparatus from the group consisting of an electronically tunable spectrometer/monochromator of symmetric single pass configuration; an electronically tunable spectrometer/monochromator of Littrow configuration, and an electronically tunable spectrometer/monochromator of multiple pass symmetric configuration.

36. The system according to claim 32 wherein said system provides an electronically tunable laser of configuration selected from the group consisting of symmetric single pass; Littrow and multipass symmetric.

* * * * *